(12) United States Patent
Vasters (10) Patent No.: US 9,830,603 B2
(45) Date of Patent: Nov. 28, 2017

(54) DIGITAL IDENTITY AND AUTHORIZATION FOR MACHINES WITH REPLACEABLE PARTS

(71) Applicant: Microsoft Technology Licensing, LLC, Redmond, WA (US)

(72) Inventor: Clemens Friedrich Vasters, Viersen (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 14/663,699

(22) Filed: Mar. 20, 2015

(65) Prior Publication Data

US 2016/0275525 A1 Sep. 22, 2016

(51) Int. Cl.
*G06F 12/14* (2006.01)
*G06Q 30/00* (2012.01)
*G06Q 10/00* (2012.01)
*H04L 29/06* (2006.01)
*H04L 9/08* (2006.01)
*H04L 9/32* (2006.01)

(52) U.S. Cl.
CPC .......... *G06Q 30/018* (2013.01); *G06Q 10/20* (2013.01); *H04L 9/083* (2013.01); *H04L 9/321* (2013.01); *H04L 63/06* (2013.01); *H04L 63/10* (2013.01); *H04L 63/20* (2013.01)

(58) Field of Classification Search
USPC ........................................................ 713/193
See application file for complete search history.

(56) References Cited

U.S. PATENT DOCUMENTS 4,700,376 A 10/1987 Ohya
6,298,378 B1 10/2001 Angal
(Continued)

FOREIGN PATENT DOCUMENTS

CN 101164303 4/2008
CN 101831889 9/2010
(Continued)

OTHER PUBLICATIONS

Farcas, et al., "Addressing the Integration Challenge for Avionics and Automotive Systems—From Components to Rich Services", Proceedings of the IEEE, vol. 98, No. 4, Apr. 2010, pp. 562-583.
(Continued)

*Primary Examiner* — Amare F Tabor
(74) *Attorney, Agent, or Firm* — Workman Nydegger (57) ABSTRACT

A machine includes a number of slots. Each of the slots is configured to receive one or more components for implementing some functionality role of the slot in the machine. The machine further includes one or more replaceable components in each of the slots. The components are configured to communicate (or be communicated for) on behalf of a slot or the machine, to an external system(s). The external system(s) implement rules to perform authorization or other operations based on the role of the slot in the context of the machine. A different derived key is used to communicate by or for each component with the external system. Each derived key for a component is derived from a machine proof for the machine and information identifying the slot in which the component is installed.

16 Claims, 3 Drawing Sheets

(56) References Cited

U.S. PATENT DOCUMENTS

| | | | |
|---|---|---|---|
| 6,622,014 B1* | 9/2003 | Daniel | H04M 1/673 380/247 |
| 6,625,729 B1 | 9/2003 | Angelo et al. | |
| 6,751,657 B1 | 6/2004 | Zothner | |
| 6,766,368 B1 | 7/2004 | Jakobson | |
| 7,062,272 B2 | 6/2006 | Grilli | |
| 7,162,036 B2 | 1/2007 | Rowe | |
| 7,209,955 B1 | 4/2007 | Major | |
| 7,243,156 B2 | 7/2007 | Hahn | |
| 7,412,461 B2 | 8/2008 | Sholl | |
| 7,509,304 B1 | 3/2009 | Pather et al. | |
| 7,516,208 B1 | 4/2009 | Kerrison | |
| 7,613,721 B2 | 11/2009 | Horvitz et al. | |
| 7,617,160 B1 | 11/2009 | Grove et al. | |
| 7,617,162 B2 | 11/2009 | Saini | |
| 7,650,505 B1 | 1/2010 | Masurkar | |
| 7,676,812 B2 | 3/2010 | Cabrera | |
| 7,743,137 B2 | 6/2010 | Sarwono et al. | |
| 7,765,281 B1 | 7/2010 | Crow | |
| 7,774,792 B2 | 8/2010 | Anderson et al. | |
| 7,797,306 B1 | 9/2010 | Pather | |
| 7,817,544 B2 | 10/2010 | Zhu | |
| 8,001,232 B1 | 8/2011 | Saulpaugh et al. | |
| 8,185,148 B2 | 5/2012 | Kamat | |
| 8,428,227 B2 | 4/2013 | Angel et al. | |
| 8,464,941 B2* | 6/2013 | Koraichi | G06F 21/73 235/382 |
| 8,839,360 B1* | 9/2014 | Orr | G06F 21/33 726/2 |
| 9,112,700 B2* | 8/2015 | Link, II | G08G 1/205 |
| 9,208,624 B2* | 12/2015 | Rude | H04L 63/0876 |
| 9,248,807 B2* | 2/2016 | Lee | B60R 25/2018 |
| 9,515,829 B2* | 12/2016 | Matsumoto | G06F 8/61 |
| 9,571,284 B2* | 2/2017 | Leboeuf | H04L 9/3226 |
| 2001/0038639 A1 | 11/2001 | McKinnon et al. | |
| 2001/0038640 A1 | 11/2001 | Mckinnon, III et al. | |
| 2002/0129141 A1 | 9/2002 | Sogabe et al. | |
| 2003/0041110 A1* | 2/2003 | Wenocur | G06Q 10/107 709/206 |
| 2003/0191856 A1 | 10/2003 | Lewis et al. | |
| 2004/0003231 A1 | 1/2004 | Levenson et al. | |
| 2004/0025014 A1 | 2/2004 | Kaler | |
| 2004/0064387 A1 | 4/2004 | Clarke | |
| 2004/0177156 A1 | 9/2004 | Hahn et al. | |
| 2004/0203644 A1 | 10/2004 | Anders | |
| 2004/0254993 A1 | 12/2004 | Mamas | |
| 2005/0220064 A1 | 10/2005 | Hundscheidt et al. | |
| 2005/0278416 A1 | 12/2005 | Kay | |
| 2006/0130046 A1 | 6/2006 | Oneill | |
| 2006/0153616 A1 | 7/2006 | Hofmann | |
| 2006/0177058 A1 | 8/2006 | Sarwono et al. | |
| 2006/0224772 A1 | 10/2006 | Saccocio | |
| 2006/0235715 A1 | 10/2006 | Abrams et al. | |
| 2007/0094251 A1 | 4/2007 | Lu et al. | |
| 2007/0112635 A1 | 5/2007 | Loncaric | |
| 2007/0112714 A1 | 5/2007 | Fairweather | |
| 2007/0180119 A1 | 8/2007 | Khivesara et al. | |
| 2007/0208759 A1 | 9/2007 | Von Koch | |
| 2007/0220558 A1 | 9/2007 | Jung | |
| 2007/0230920 A1 | 10/2007 | Gasper | |
| 2007/0260674 A1 | 11/2007 | Shenfield | |
| 2008/0063154 A1 | 3/2008 | Tamari | |
| 2008/0077561 A1 | 3/2008 | Yomtobian | |
| 2008/0120432 A1 | 5/2008 | Lamoureaux et al. | |
| 2008/0133395 A1 | 6/2008 | Jimenez et al. | |
| 2008/0201484 A1 | 8/2008 | Sano et al. | |
| 2008/0285542 A1 | 11/2008 | Jachner | |
| 2008/0301061 A1 | 12/2008 | Kittelsen | |
| 2008/0306970 A1 | 12/2008 | Gilman | |
| 2008/0306984 A1 | 12/2008 | Friedlander et al. | |
| 2009/0070228 A1 | 3/2009 | Ronen | |
| 2009/0132684 A1 | 5/2009 | Pelley et al. | |
| 2009/0153311 A1* | 6/2009 | Lee | B60R 25/2018 340/426.1 |
| 2009/0187593 A1 | 7/2009 | Chen et al. | |
| 2009/0204706 A1 | 8/2009 | Ertugrul et al. | |
| 2009/0264102 A1 | 10/2009 | Parmar | |
| 2010/0042519 A1 | 2/2010 | Dingler et al. | |
| 2010/0083124 A1 | 4/2010 | Druzgalski et al. | |
| 2010/0095242 A1 | 4/2010 | Freeny, Jr. | |
| 2010/0114857 A1 | 5/2010 | Edwards et al. | |
| 2010/0227632 A1 | 9/2010 | Bell | |
| 2010/0287295 A1 | 11/2010 | Schaffa et al. | |
| 2011/0029598 A1 | 2/2011 | Arnold | |
| 2011/0125753 A1 | 5/2011 | Dow et al. | |
| 2011/0153349 A1 | 6/2011 | Anderson et al. | |
| 2011/0161167 A1 | 6/2011 | Jallapuram | |
| 2011/0161987 A1 | 6/2011 | Huang | |
| 2011/0167357 A1 | 7/2011 | Benjamin et al. | |
| 2011/0173522 A1 | 7/2011 | Gupta | |
| 2011/0231256 A1 | 9/2011 | Wang et al. | |
| 2011/0282949 A1 | 11/2011 | Rivkin | |
| 2011/0321062 A1 | 12/2011 | Pope et al. | |
| 2012/0005025 A1 | 1/2012 | Aaltonen et al. | |
| 2013/0054706 A1 | 2/2013 | Graham et al. | |
| 2013/0066674 A1 | 3/2013 | Vasters | |
| 2013/0066828 A1 | 3/2013 | Vasters | |
| 2013/0066979 A1 | 3/2013 | Vasters | |
| 2013/0066980 A1 | 3/2013 | Vasters | |
| 2013/0067015 A1 | 3/2013 | Vasters | |
| 2013/0067024 A1 | 3/2013 | Vasters | |
| 2013/0067025 A1 | 3/2013 | Vasters | |
| 2013/0117578 A1* | 5/2013 | Ihle | G06F 12/1425 713/193 |
| 2013/0211559 A1 | 8/2013 | Lawson et al. | |
| 2013/0227650 A1* | 8/2013 | Miyake | H04L 63/08 726/3 |
| 2014/0244710 A1 | 8/2014 | Sharma et al. | |
| 2015/0358329 A1* | 12/2015 | Noda | G06F 21/57 726/4 |

FOREIGN PATENT DOCUMENTS

| | | |
|---|---|---|
| CN | 102147903 | 8/2011 |
| CN | 203689132 U | 7/2014 |
| EP | 0005965 B1 | 7/1983 |
| EP | 2482488 A1 | 8/2012 |
| JP | 2001249873 | 9/2001 |
| JP | 2003323557 | 11/2003 |
| JP | 2004326480 | 11/2004 |
| JP | 2005532714 | 10/2005 |
| JP | 2006099792 | 4/2006 |
| JP | 2007072843 | 3/2007 |
| JP | 2007516511 | 6/2007 |
| JP | 2009265703 | 11/2009 |
| KR | 10-2009-0019462 | 2/2009 |
| KR | 10-2011-0071828 | 6/2011 |
| RU | 2251728 | 5/2005 |
| RU | 2380754 | 1/2010 |
| RU | 2390964 | 5/2010 |
| WO | 2010000826 | 1/2010 |
| WO | 2014127429 A1 | 8/2014 |

OTHER PUBLICATIONS

"International Search Report and Written Opinion issued in PCT Application No. PCT/US2016/023001", dated Jun. 22, 2016, 18 pages.

"Office Action Issued in Chinese Patent Application No. 201210335057.8", dated Jul. 21, 2016, 7 Pages.

Office Action Issued in Japanese Patent Application No. 2014-529931, dated Jul. 27, 2016, 6 Pages.

Office Action Issued in Australian Patent Application No. 2012308935 dated Oct. 27, 2016.

Office Action issued in Chinese Patent Application No. 201210335115.7 dated Nov. 28, 2016.

Office Action issued in Chinese Patent Application No. 2014529931 dated Dec. 14, 2016.

Brennan, Patrick, "Adding Push Notifications to your App: Build or Buy?", Sep. 13, 2011, Available at http://blog.w3i.com/2011/09/13/adding-push-notifications-to-your-app-build-or-buy/.

(56) References Cited

OTHER PUBLICATIONS

"Apple Push Notification Service", Retrieved on: Sep. 16, 2011, Available at: http://;en.wikipedia.org/wiki/Apple_Push_Notification_Service.
Kiriaty, Yochay, "Understanding Microsoft Push Notifications for Windows Phones", May 3, 2010, Available at: http://windowsteamblog.com/windows_phone/b/wpdev/archive/2010/05/03/understanding-microsoft-push-notifications-for-windows-phones.aspx.
"Introduction to Data Warehousing", Retrieved on Sep. 19, 2011, Available at: http://dataminingtools.net/wiki/introdw.php.
Al-Shaer, Ehab Salem, "A Hierarchical Filtering-based Monitoring Architecture for Large-Scale Distributed Systems", A Dissertation Submitted to the Faculty of Old Dominion University and Partial Fulfillment of the Requirements for the Degree of Doctor of Philosophy, Computer Science, Dec. 1998, 223 pages.
Patel, Jay A., "Exploiting System Diversity in Peer-to-Peer Publish-Subscribe Systems", Dissertation, Submitted in Partial Fulfillment of the Requirements for the Degree of Doctor of Philosophy in Computer Science in the Graduate College of the University of Illinois, May 2009, 124 pages.
"Amazon Simple Notification Service (Amazon SNS)", Retrieved on: Sep. 19, 2011, Available at: http://aws.amazon.com/sns/.
Yoon et al., "On-demand Replication for Failover in Content-based Publish/Subscribe Overlays", In Middleware Systems Research Group Technical Report, Nov. 2009, pp. 1-12.
Vasters, Clemens, "Introducing the Windows Azure AppFabric Service Bus May 2011 CTP", Published on : May 16, 2011, Available at: http://vasters.com/clemensv/2011/05/16/Introducing+The+Windows+Azure+AppFabric+Service+Bus+May+2011+CTP.aspx.
Chou, David, "Using Events in Highly Distributed Architectures", In Journal of Microsoft Architecture, Oct. 2008, 10 pages.
"Yahoo! Sportacular", Retrieved on: Sep. 22, 2011, Available at: http://mobile.yahoo.com/spoets/iphone.
"Windows Phone 7 Development: Push Notifications—Implementing Toast Notifications", Published on: May 17, 2011, Available at: http://programming4.us/mobile/3696.aspx.
Podnar, et al., "Mobile Push: Delivering Content to Mobile Users", In Proceedings of 22nd International Conference on Distributed Computing Systems Workshops, 2002, pp. 563-568.
Thawani, et al., "Context-aware Timely Information Delivery in Mobile Environments", In Proceedings of the Computer Journal, vol. 50, Issue 4, Mar. 13, 2007, pp. 460-472.
Aalto, et al., "Bluetooth and WAP Push Based Location-Aware Mobile Advertising System", In Proceedings of 2nd International Conference on Mobile Systems, Applications, and Services, Jun. 6-9, 2004, pp. 49-58.
"The Data Distribution Service-reducing Cost through Agile Integration", Published on: 2011, Available at least as early as Sep. 23, 2011 at: http://www.ucsarchitecture.org/downloads/DDS%20Exec%20Brief%20v20I-public.pdf.
Roganovic, et al., "A Real-time Traffic Information Service for Efficient Navigation and Transport Management", In Proceedings of AGILE, Apr. 18-22, 2011, 4 pages.
"Customized Notifications", Retrieved on: Sep. 19, 2011, 8 pages, Available at: http://www.ilient.com/Sysforums/templates/default/help/files/CustomNotifications.htm.
Fiege, et al., "Modular Event-Based Systems", In Journal of the Knowledge Engineering Review, Volume 17, Issue 4, Dec. 2002, 43 pages.
Fiege, et al., "Engineering Event-Based Systems with Scopes", In Proceedings of the 16th European Conference on Object-Oriented Programming, vol. 2374, Jun. 2002, pp. 309-333.
Chen, et al., "An Efficient Spatial Publish/Subscribe System for Intelligent Location-Based Services", In Proceedings of 2nd International Workshop on Distributed Event-based Systems, Jun. 8, 2003, pp. 1-6.
Hoffert, et al., "Evaluating Transport Protocols for Real-Time Event Stream Processing Middleware and Applications", In Proceedings of the Confederated International Conferences, CoopIS, DOA, IS, and ODBASE on On the Move to Meaningful Internet Systems, Part I, Nov. 1-6, 2009, pp. 614-633.
Huang, et al., Publish/Subscribe in a Mobile Environment, In Journal of Wireless Networks—Special Issue: Pervasive Computing and Communications, vol. 10, Issue 6, Nov. 2004, pp. 643-652.
First Office Action and Search Report Issued in Chinese Patent Application No. 201210335115.7, dated Nov. 27, 2014, 11 Pages.
First Office Action and Search Report Received for Chinese Patent Application No. 201210335131.6, dated Jan. 12, 2015, 11 Pages.
"Excerpt. Chapter 11: Routing Slip ED—Hohpe Gregor; Woolf Bobby", Jan. 2004, Enterprise Integration Patterns: Designing, Building, and Deploying Messaging Solutions.
"Enterprise Integration Patterns—Recipient List", Jan. 2004, Available at <<http://www.enterpriseintegrationpatterns.com/RecipientList.html>>.
Supplementary Search Report issued in European Patent Application No. 12830940.8, dated Mar. 25, 2015, 6 Pages.
First Office Action Issued in Chinese Patent Application No. 201210335057.8, dated Apr. 29, 2015, 12 Pages.
Supplementary Search Report Issued in European Patent Application No. 12832240.1, dated Jun. 3, 2015, 5 Pages.
Second Office Action Received for Chinese Patent Application No. 201210335115.7, dated Aug. 17, 2015, 8 Pages.
Second Office Action Issued in Chinese Patent Application No. 201210335131.6, dated Oct. 9, 2015, 7 Pages.
"Second Office Action Issued in Chinese Patent Application No. 201210335057.8", dated Dec. 28, 2015, 11 Pages.
"Third Office Action Issued in Chinese Patent Application No. 201210335131.6", dated Apr. 11, 2016, 8 Pages.
U.S. Appl. No. 13/278,418, Feb. 27, 2013 Office Action.
U.S. Appl. No. 13/278,408, Mar. 29, 2013, Office Action.
U.S. Appl. No. 13/278,415, Apr. 17, 2013, Office Action.
U.S. Appl. No. 13/278,313, Apr. 25, 2013, Office Action.
U.S. Appl. No. 13/278,401, May 8, 2013, Office Action.
U.S. Appl. No. 13/278,422, May 16, 2013, Office Action.
U.S. Appl. No. 13/278,427, Jun. 27, 2013, Office Action.
U.S. Appl. No. 13/278,427, Aug. 20, 2013, Notice of Allowance.
U.S. Appl. No. 13/278,422, Oct. 18, 2013, Final Office Action.
U.S. Appl. No. 13/278,313, Nov. 15, 2013, Final Office Action.
U.S. Appl. No. 13/278,418, Nov. 21, 2013, Office Action.
U.S. Appl. No. 13/278,408, Dec. 4, 2013, Notice of Allowance.
U.S. Appl. No. 13/278,415, Dec. 30, 2013, Final Office Action.
U.S. Appl. No. 13/278,401, Feb. 28, 2014, Final Office Action.
U.S. Appl. No. 13/278,313, Sep. 2, 2014, Office Action.
U.S. Appl. No. 13/278,418, Oct. 20, 2014, Office Action.
U.S. Appl. No. 13/278,415, Dec. 22, 2014, Office Action.
U.S. Appl. No. 13/278,313, Feb. 25, 2015, Final Office Action.
U.S. Appl. No. 13/278,401, Apr. 2, 2015, Office Action.
U.S. Appl. No. 13/278,415, Jul. 1, 2015, Final Office Action.
U.S. Appl. No. 13/278,418, Jul. 17, 2015, Office Action.
U.S. Appl. No. 13/278,313, Aug. 3, 2015, Notice of Allowance.
U.S. Appl. No. 13/278,415, Feb. 16, 2016, Office Action.
U.S. Appl. No. 13/278,418, Mar. 23, 2016, Office Action.
U.S. Appl. No. 13/278,415, May 18, 2016, Final Office Action.
Office Action issued in European Application No. 12832240.1, dated Feb. 8, 2017.
International Preliminary Report on Patentability issued in PCT Application No. PCT/US2016/023001, dated Feb. 8, 2017.
"ADAL—Server to Server Authentication", Retrieved on: Dec. 9, 2014 Available at: https://code.msdn.microsoft.com/windowsazure/aal-server-to-server-9aafccc1.
Vasters, Clemens, "Service Assisted Communication for Connected Devices", Published on: Feb. 9, 2014 Available at: http://blogs.msdn.com/b/clemensv/archive/2014/02/10/service-assisted-communication-for-connected-devices.aspx.
Bormann, et al., "Clearing off the Cloud over the Internet of Things", Published on: Oct. 27, 2014 Available at: https://www.w3.org/2014/strintipapers/28.pdf.
Perkins, Earl, "The Identity of Things for the Internet of Things", Published on: Aug. 4, 2014 Available at: http://blogs.gartner.com/earl-perkins/2014/08/04/the-identity-of-things-for-the-internet-of-things/.

(56) References Cited

OTHER PUBLICATIONS

"Machine-to-Machine Communications (M2M); Use Cases of M2M applications for eHealth", In Technical Report ETSI TR 102 732, Sep. 2013, 29 pages.

Morrow, Monique, "Internet of Everything (IoE) Secure Framework", Published on: Jul. 11, 2013 Available at: http://blogs.cisco.com/sp/internet-of-everything-ioe-secure-framework.

"Office Action Issued in Russian Patent Application No. 2014109356", dated Jun. 8, 2016, 4 Pages. (W/o English Translation).

"Office Action Issued in Mexican Patent Application No. MX/a/2014/002956", dated Sep. 2, 2016, 8 Pages. (W/o English Translation).

"Notice of Allowance Issued in Russian Patent Application No. 2014109356", dated Nov. 8, 2016, 17 Pages.

"Third Office Action and Search Report Issued in Chinese Patent Application No. 201210335057.8", dated May 17, 2017, 16 Pages.

Australian Office Action issued in Australian application No. 2012308935 dated Jun. 30, 2017.

Office Action dated Jun. 23, 2017 cited in U.S. Appl. No. 13/278,418 (Copy Attached).

Australian Office Action issued in AU Application No. 2012308935 dated Feb. 13, 2017.

"Office Action Issued in Mexican Patent Application No. MX/a/2014/002956", dated Mar. 7, 2017, 11 Pages. (W/O English Translation).

* cited by examiner

DIGITAL IDENTITY AND AUTHORIZATION FOR MACHINES WITH REPLACEABLE PARTS

BACKGROUND

Background and Relevant Art

Automobiles, aircraft, locomotives, machine tools, robots, etc. are complex machines made nearly entirely from replaceable parts. Parts are exchanged because they have a limited design lifetime for safe operation, because they are meant to be consumed during the normal course of operation, because they are damaged or destroyed due to accidents or other catastrophic events, because they develop unexpected defects, etc. For example, the only true barrier to replacing every single part of a car, even the frame, is that it is commonly not economically viable to do so. For very rare or culturally or historically significant artifacts, economic viability may not even be a factor. Complex machines can also be stolen, hijacked, vandalized, or tampered with.

Digital components play a key role in today's machines, and provide increasingly detailed operational and diagnostics insight through telemetry emission as well as digital control capabilities that range from managing the telemetry flow to immediate control of physical component functions by local or remote automation, management, and servicing systems.

As any electronics hardware component in a complex machine is quite likely replaceable, it is not instantly obvious what determines the digital identity of an object, such as an automobile or an aircraft, for external control and analytics systems. If the digital identity of an automobile were anchored to a telematics box and the box is destroyed in an accident, replaced due to a defect, upgraded to a newer generation device, or if the box gets stolen overnight as the car is parked in a dark lot, the digital identity of the automobile, and potentially the history of the automobile may be compromised.

Digital components aside, the common model for establishing identity for an automobile is to assign the factory product a vehicle identification number (VIN). For aircraft, identity is established by assigning a construction number (c/n), also called manufacturer serial number (MSN). An aircraft jet engine, which is a much more agile part than a vehicle engine and a multi-million dollar machine in and of itself, will be routinely swapped out for other engines during maintenance and its own identity is established through an engine serial number.

The subject matter claimed herein is not limited to embodiments that solve any disadvantages or that operate only in environments such as those described above. Rather, this background is only provided to illustrate one exemplary technology area where some embodiments described herein may be practiced.

One embodiment illustrated herein includes a machine. The machine includes a number of slots. Each of the slots is configured to receive one or more components for implementing some functionality role of the slot in the machine. The machine further includes one or more replaceable components in each of the slots. The components are configured to communicate or be communicated for, on behalf of a slot or the machine, to an external system or set of systems. The external system(s) implement rules to perform authorization or other operations based on the role of the slot in the context of the machine, and independent of the component per se. A different derived key is used to communicate by or for each component with the external system, either by using the key itself, or by using the key to sign a token. Each derived key for a component is derived from a machine proof for the machine and information identifying the slot (and optionally an iterator) in which the component is installed. The external system, using the machine key, can verify derived keys or tokens signed with derived keys.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Presently, an increasing number of parts have their own digital control and telemetry capabilities. Embodiments herein allow the conceptual identity of a machine can be maintained over its lifetime independent of the concrete pieces that make up the machine at some point in time, and allow for continuity for component data attribution as well as system access policy rules, even if concrete components are replaced or upgraded.

All conceivable things and contraptions with any sort of digital functionality are summarily called machines herein.

Existence describes the identity of a machine or some other material "thing" that is entirely composed of replaceable material parts and which retains its identity even if parts were added or removed or every single one of the current parts were swapped out for other parts, even if those parts were functionally more or less capable. This applies specifically also to replaceable digital components holding cryptographic material and logic that would commonly be the foundation for establishing digital identity in information technology systems. Thus, existence is a single embodiment of the machine's construction plan, without that embodiment's identity being anchored on any of the concrete parts used in the construction.

While "machine" is used herein to allow for a concrete discussion, what is consistently meant is "machine existence" and not "machine manifestation at a S particular instant".

Every concrete component or part installed in a machine has a particular functional role. The role is assigned to the component type in the machine's construction plan. A concrete part begins fulfilling that role when it is built into the machine context, becoming an actor in the context by ways of being associated with the role. When the part is exchanged, it ceases fulfilling the role in the machine context and thus ceases being an actor. Embodiments herein can implement functionality to allow machines to maintain their existence identity, even in the face of changing components, while also implementing secure communications from components in the machines. This can improve machine security by using derived keys for components derived from a secure and closely held machine proof.

Figure 1:
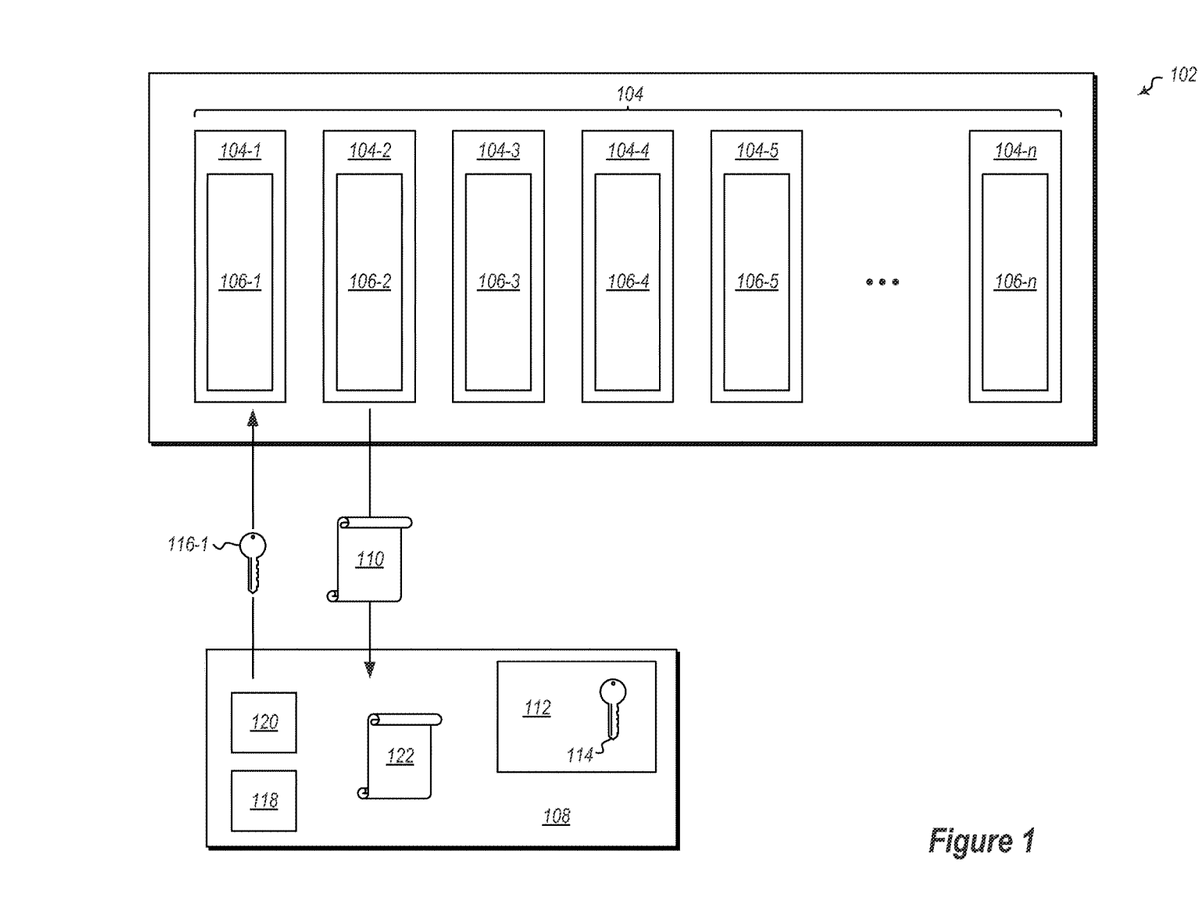
FIG. 1 illustrates a machine having replaceable parts and an external system configured to verify communication with the machine.

An example is illustrated with reference to FIG. 1. FIG. 1 illustrates a machine 102. The machine 102 comprises a plurality of slots 104. The slots represent a role in a machine context. For example, a slot in an automobile may be an engine slot. Another slot may be a control computer slot. Another slot may be an odometer slot, etc. The slot represents the role, while a component in a slot represents an instance of a device that fills the role for the particular machine. Each of the slots in the plurality of slots is configured to receive one or more replaceable components (106-1-106-n) for implementing some functionality in the machine 102. The components can be virtually any replaceable components. Thus, for example, in an automobile, a component may be an engine, a sensor, a control module, etc. in a computer system, a component could be a storage device, networking hardware, a processor, a display adapter, etc.

The components in the plurality of slots 104 have the ability themselves to communicate or are associated with a component that can communicate on their behalf. This may be by having digital information and/or hardware that allows the components to provide information about the component. The component can therefore communicate on behalf of a slot or the entire machine itself.

As will be described later herein, an external system 108 with which the component communicates or is communicated for (such as by sending message 110) has rules that perform authorization or other operations based on the identity of the slot in the context of the machine, and independent of the component per se. Thus, a new component could communicate on behalf of the role which that component fills as a component in a particular machine. For example, in some embodiments, each component has a derived key from machine proof that can be used to verify both the component in its given role and the machine in which it is implemented. The key may be derived from the aforementioned machine proof, an identifier for the slot in which it is installed, and potentially some discriminator (such as an incrementing instance identifier as new components are incremented when replacing previous components). This will be described in more detail below.

Relationships

Every machine (i.e., every machine existence) has a number of external relationships, whose nature varies with the machine's purpose. People or services have roles toward a machine and/or its subcomponents (e.g. a driver, pilot, maintainer, passenger, operator), and the machine, through its set of actors fulfilling their designated roles, takes on particular roles towards external services (e.g. a telemetry emitter) and services have roles towards the machine's components (e.g. a controller).

These relationships can be of permanent or ephemeral nature and may last for very long periods of time, very short periods of time, or anything in-between. Especially permanent relationships should not depend on the particular digital identity of concrete parts installed at some instant, but should persist as the parts are swapped out.

All external relationships to and from an existence are established with the existence's roles. In particular, this refers to access control policy rules. Some embodiments may include a role that represents the entirety of the existence.

For example, a particular vehicle's (existence) braking control system (role) installation (actor) is authorized by a data collection system (such as the system 108) to send brake telemetry data, because the brake telemetry analysis system allows for whatever part is installed today as that vehicle's braking control system to send it data. Authorization and authentication with respect to receiving communications will be discussed in more detail below.

In the examples illustrated herein existence is an object that confers identity and refers to a machine's existence. Embodiments may be implemented where it is not possible to directly impersonate an existence and it is thus not possible to be authenticated as an existence. Such an existence carries no credentials.

Existence is similar to the notion of a group in that associations exists to it from a number of identity objects that can be authenticated and impersonated in the system. It is not the same as a group in that existence carries a predefined structure of roles with a designated actor filling each such role.

For example, there are not just four main engines on a large jet airplane. There are four distinct nacelle homes at port outer, port inner, starboard inner, and starboard outer into which concrete engines are installed. For proper and safe operation of the airplane these should never be confused or used interchangeably. Simpler machines may only have a single role, and some machines may have trivial roles that are more similar to a group.

The role structure of an existence is generally derived from an abstracted machine construction plan that is common across very many instantiations of the same machine and it should therefore be assumed that existence objects are commonly created from a template expressing the desired role structure. However, as the existence refers to a single, concrete embodiment of the machine that can subsequently be changed or upgraded quite independently of its construction-time siblings, any use of such templates yield an independent structural copy.

Actors are identity carrying objects. The object type of an actor can be a "user" or "service" or other suitable entity in a concrete implementation and infrastructure framework. Actor merely describes the object's relationship towards the existence via a role association.

It is assumed that replacement parts undergoing servicing or refurbishment will not necessarily be re-provisioned with fresh cryptographic material during the servicing process and that it may indeed be impossible or even undesired to do so in many situations. The digital identity of a part may quite well be stable over its entire lifetime and established through embedded and un-extractable private cryptographic material. In that case it can then self-authenticate to anyone in possession of the matching public cryptographic material without reliance on any additional third party.

It is also assumed that the existence and its roles will generally remain stable and that addition or removal of roles after initial creation will be a very rare occurrence—much rarer than existing roles staying vacant due to missing parts.

The evaluation of a role association by an authorization service results in an actor "acting on behalf of" the designated role in the context of the existence's identity. The actor's authentication material is ultimately the basis for establishing a secure context towards the authorization service, but the actor's own identity only plays an informational role (if any) in any further context once the role association is validated and an authorization token is issued that confers on the bearer authority to a fulfill a particular role in the context of a particular existence.

All services that the machine (e.g. machine 102) and its components (e.g. components 106-1 through 106-n) (or the existence and its roles) depend on and federate with the authorization service (e.g. the external system 108), and might base their own authorization rules on understanding the composite identity of existence and role as "user" in their own context. The authorization service may also act as a credentials vault, releasing credentials to a dependent service such that the dependent service may access them, but the actor cannot. Thus, while the examples herein have illustrated interaction with the external system 108, it should be appreciated that the external system 108 may federate with other systems to perform verification and authorization for those other system.

All granted rights resulting from role association evaluation are lifetime constrained in a way that even the urgent replacement of a part or a part being stolen does not result in significant exposure.

Additional details are now illustrated.

In FIG. 1, the external system 108 has a vault 112 used to store existence keys for various machines, such as machine 102. In the example illustrated, the external system 108 stores an existence key 114 for the machine 102. The machine 102 may know an identifier for itself (such as a VIN) but does not have access to its own existence key 114. This may be slightly modified in some embodiments, when a trusted module on the machine 102 may have access to the existence key, but cannot provide that key to any other component and the key cannot be extracted from the module.

In a very simple example, an id number for the machine 102 may be: "11111" and the existence key for the machine may be: "72872872782987297292787 2982". Thus, the key vault 112 may maintain the following id/key pair for the machine 102:

id: "11111" key: 72872872782987297292787 2982

The external system 108 may be able to generate role keys for components in the system 102. For example, in one embodiment, the external system can generate a role key based on the existence key 114 for the machine 102 and specific role information for a component fulfilling a particular role. For example, the component 106-1 may be fulfilling the role 104-1 in the machine 102. Assume that the role 104-1 is a telematics box role identified by the role "tb" Assume also that the component 106-1 is the first telematics box installed on the machine 102. The role 104-1 in the present incarnation of the machine 102 could be identified by:

role: "1111.1/tb/1"

where "11111" represents the machine 102, "tb" represents the telematics box role, and "1" represents an increment representing the first component in this particular role. Embodiments could derive a role key for the role 104-1 using the existence key 114 and role information. Thus, the role key for the component 106-1 may be calculated as illustrated by the following hash (or other key derivation function):

["72872872782987297292787 2982/tb/1"]=> 267823990172761822721

Thus, the role key 116-1 for the component 106-1 is given by:

role: "11.111/tb/1" key: 267823990172761822721

This role key 116-1 could be provided to the machine 102, and in some cases, to the component 106-1 itself when the component 106-1 is able to store and/or communicate the key 116-1.

In some embodiments, the role keys will not need to be maintained by any entity (including the external system 108) except an entity that communicates for the role. The role key can be authenticated through an authentication process as will be illustrated in more detail below.

Role keys could be provided for components at various times. For example, role keys could be generated in conjunction with the manufacturing process. A manufacturing plant could be connected to the external system 108 and could request role keys from the external system 108 as components are installed during manufacturing.

Role keys could also be generated and provided as components are replaced. In particular, a new role key will be generated when a new component replaces an old component in the same role. The new role key may differ from the previous role key and may be based on the iteration of components. In some embodiments, the role key is independent of the component itself in particular, but is rather based on the role filled by the component and the iteration of the role that the component fills. Thus, the particular device specific details of the component may be unimportant for generating role keys. Rather, the only important detail may be that it is, for example, the second (or third, or fourth, etc.) component to fill that particular role. Other details about the specific component do not need to be used to generate a role key.

A repair person could communicate with the external service 108 to provide a machine identifier and the role to the external service. The repair person could also provide the iteration, although they may not have such information. In this case, the external service 108 may store (or otherwise have access to) information regarding previous iterations of a component such that the component iteration would not need to be provided by the repair person. The role key for that iteration could be generated and provided to the repair person for installation in the machine 102. In some embodiments, the repair person may have access to a list of role keys by iteration and can simply associate the appropriate role key with the component as it is installed.

Role keys can be associated with components in a number of different ways. For example, if the component has the ability to store and communicate the role key, such as on firmware, in software, or other means, then the role key could be stored directly on the component. Thus, as the component is readied for installation, the role key could be applied.

If the component does not have communicative abilities enabling storage of the role key, the role key could be provided to a surrogate that could hold and communicate the role key on behalf of the component. For example, a main computer system on an automobile may be able to hold the role key for the engine.

The role key allows a component to communicate or be communicated for, to a secure system. The secure system can validate the component in the role and in the machine to determine if the component is a valid actor, as filling the role in the machine. For example, a component in the machine 102 may communicate with the external system 108 as a role (or on behalf of a role) in the machine 102. For example, a component 106-1 may make the following call (using, e.g. the message 110) in the role represented by the slot 104-1 of the machine 102:

```
call:
{
    data : "..."
    token: {
        role: "11111/tb/1",
        proof: 8272309302812871932932
    }
}
```

In this example, a call with some data is made. The call may include a request for data or services, a report of machine 102 functionality, or fill some other function. The call further includes a token. The token includes an indication of the role being represented, in this example, the role filled by the component 106-1 in the slot 104-1. The call further includes a signature of the token. In this example, the signature is derived by hashing (e.g. hmacsha256) various pieces of information such as machine information, role information, iteration identifiers, the data in the call, and the role key 116-1. This is represented as follows:
  proof: hmacsha256("1111/tb/1"+data, 267823990172761822721)=>proof: 8272309302812871932932

When the message 110 is received by the remote system 108, the remote system can validate the message to ensure that it is received from (or on behalf of) a particular role in the machine 102. The following illustrates how the external system uses the existence key 114 to validate the token. As noted, the token is as follows:

```
token: {
    role: "11111/tb/1",
    proof: 8272309302812871932932
}
```

The external system 108 can examine the role identifier and identify the prefix "11111" which identifies the machine 102. The external system 108 can examine the vault 112 to find the existence key 114 for the machine 102, namely the vault 112 includes the id/key pair:
  id: "11111" key: 728728727829872972927872982

The external system 108 can also identify the suffix "/tb/1". Using this suffix, the external system 108 can compute the role key 116-1 as follows:
  ["728728727829872972927872982/tb/1"]=>
      267823990172761822721

Using the computed role key 116-1, the external system can then compute the proof in the same way that the component 106-1 computed the proof. Namely, the external system computes the following hash:
  proof: hmacsha256("11111/tb/1"+data, 267823990172761822721)

The external system 108 can then check to determine if the proof computed by the external system 108 matches proof received from the component 116-1.

Key Management

Role keys may be managed in a number of different ways. For example, role keys may be time managed. Time managed keys expire after a predetermined time. In some such embodiments, expiration of a key would cause an instance increment for the key. In this case, the exact same component could have different role keys over time. In some embodiments, the time expiration could be flexible without a hard stop in certain situations. For example, one would not want a role key to expire on an airplane while the airplane is in flight. This could be addressed by either renewing keys long before they expire or allowing some leeway in extending expiration times.

Another example of role key management may be directed to black lists of role keys. For example, if a component is stolen, the role key for the component can be added to a black list at the remote system 108. The remote system 108 could then prevent any component using the role key (whether by a component being stolen, the role key being stolen, or some other situation) for authentication purposes.

In some embodiments, role key management may be performed by only allowing role keys to be held by components. When a component is removed, the component can be destroyed, or the role key can be destroyed from the component. As such, when the role key is destroyed, it cannot be used anymore for any purpose. As noted above, there is no need for any other system to store the role key as they can be regenerated at the remote system.

One illustrative embodiment is now illustrated. The illustrative embodiment includes a machine, such as the machine 102. The machine includes a plurality of slots, such as the set of slots 104. Each of the slots (e.g. slots 104-1, 104-2, 104-3, 104-4, 104-5 through 104-*n*) is configured to receive one or more components for implementing some functionality role of the slot in the machine. For example, a slot may be for an engine, a computer module, a braking system, a servo motor, a motor control, or virtually any other role in a machine. Notably, while examples of automobiles and airplanes have been used herein, it should be appreciated that virtually any type of machine could be implemented.

The machine further includes one or more replaceable components (e.g. components 106-1, 106-2, 106-3, 106-4, 106-5, through 106-*n*) in each of the slots. The components are configured to communicate or be communicated for, on behalf of a slot or the machine, to an external system or set of systems. Thus, for example, a component may have computer logic that allows for digital communication. Alternatively, the component may have the ability to store a role key (or may simply be associated with a role key) that can be read by another component that is able to communicate on behalf of the component. The external system (such as external system 108) or set of systems implement rules to perform authorization or other operations based on the role of the slot in the context of the machine, and in some embodiments, independent of the component per se. Thus, for example, the particular component selected to fill a slot will not affect authorization operations, however, as will be illustrated below, the iteration of components in slots may affect the operations.

A different derived key (e.g. a role key 116-1) is used to communicate by or for each component with the external system. Each derived key for a component is derived from a machine proof (such as an existence key 114) for the machine and information identifying the slot in which the component is installed. In some embodiments, each derived key may also be derived from a discriminator. For example, the discriminator is a time based discriminator when a derived key has a time-based expiration. Thus, for example, role keys may be configured to expire. When they expire, the next role key for the component will be created based on an incremented discriminator. For example, if a role key is based on:

role: "11111/tb/1", when that role key expires, the next role key may be based on:

role: "11111/tb/2",

In some embodiments, the discriminator is an iteration based discriminator defined by a key iteration based on the total number of derived keys that have been generated for a given slot. Thus, for example as role keys are changed for any reason for a given slot, they may be changed by using an iterator as illustrated above in the time based discriminator example.

In yet another example, the discriminator may be an iteration based discriminator defined by a component iteration based on the total number of components that have been installed in a given slot. Thus, for example, as components are replaced, the role key will be based on an incrementing discriminator as illustrated above in the time based discriminator example.

In some embodiments of the example machine each derived key (e.g. role key) for a component is derived from a machine proof for the machine and information identifying the slot in which the component is installed by the external system or set of systems and provided to a component or the machine without revealing the machine proof to the component or the machine. Thus, for example, the external system 108 may include a role key computation module 118 configured to compute role keys from machine keys and machine slot information. The external system 108 may further include a role key distribution module 120 configured to deliver role keys (e.g. role key 116-1) to machines, and in particular to components in machines.

Another specific embodiment includes a system for verifying a component by verifying the machine in which the component is implemented and the role of the component within the machine. The system (such as external system 108) includes a key vault (such as the key vault 112). The key vault is configured to store cryptographic proof (such as machines keys like machine key 114) for one or more machines (such as machine 102). The system further includes one or more processors. The system further includes one or more computer-readable media. The one or more computer-readable media include computer-executable instructions that when executed by at least one of the one or more processors cause at least one of the one or more processors to perform various acts including acts such as those illustrated below in FIG. 3.

The system may further include a blacklist of tokens or keys (such as blacklist 122) that are not authorized to be used in the context of any roles in the machine. Thus, for example, if a component is stolen, its role key can be added to the blacklist 122 to prevent that component from communicating on behalf of the machine or slot.

The system of claim may include a role key computation module (such as the role key computation module 118) configured to generate role keys from machine keys stored in the key vault for components installed in machines. The system may further include a role key distribution module (such as role key distribution module 120) configured to provide role keys to components of machines having machine keys stored in the key vault.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
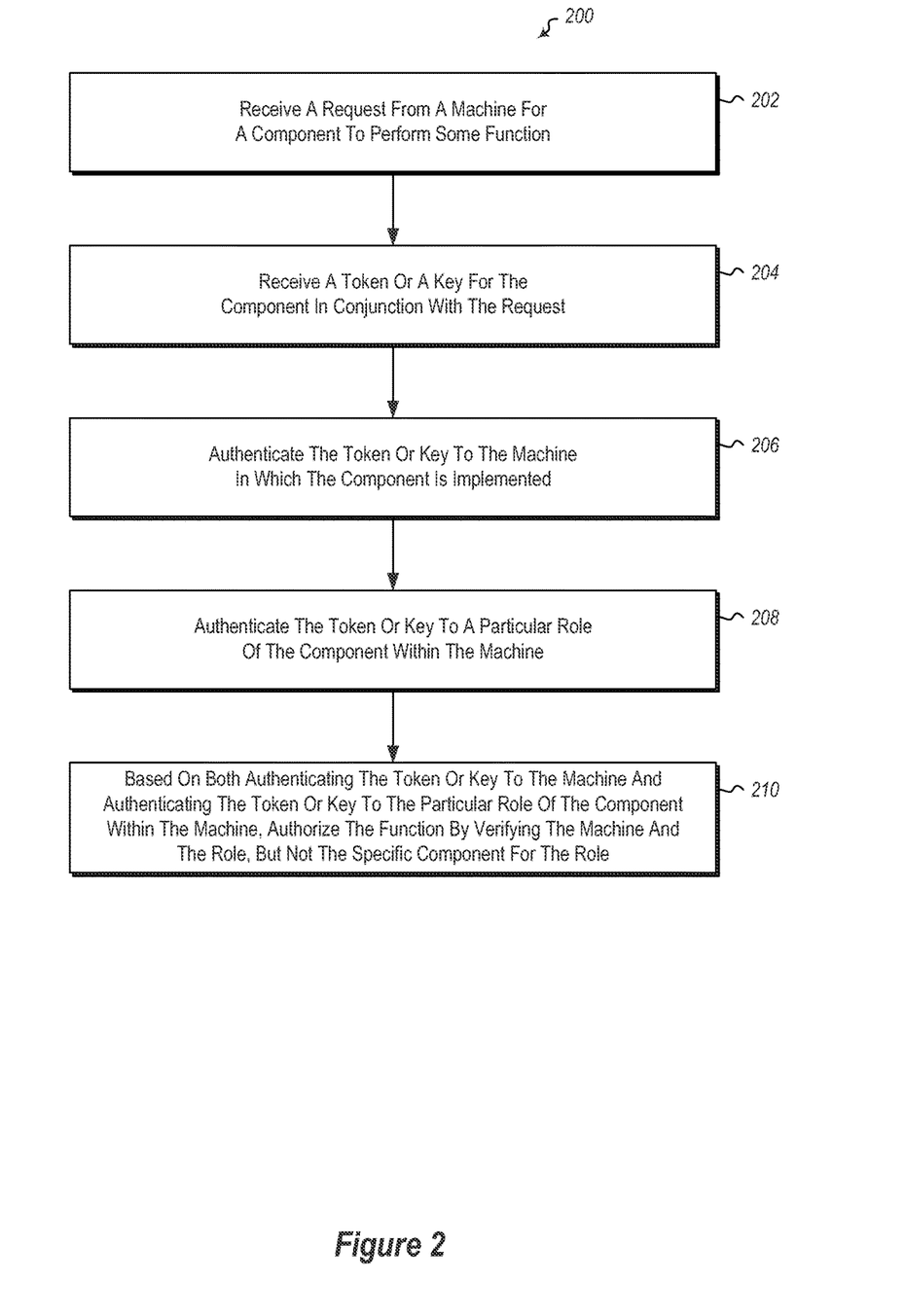
FIG. 2 illustrates a method of verifying a component in a machine.

Referring now to FIG. 2, a method 200 is illustrated. The method 200 may be practiced in a computing environment and includes acts for verifying a component by verifying a machine in which the component is implemented, and the role of the component within the machine. The method includes receiving a request from a machine for a component to perform some function (act 202). For example, FIG. 1 illustrates a message 110 that may include the request to perform some function. The function may be to have data stored, to obtain some data for the machine, to authorize some component operations, or some other request. The message 110 may be sent from the component itself or from another component configured to communicate on behalf of the component.

The method 200 further includes receiving a token or a key for the component in conjunction with the request (act 204). Thus, for example, the message 110 may include a token or key. In the example illustrated above, the message 110 includes a token signed by a role key 116-1.

The method 200 further includes authenticating the token or key to the machine in which the component is implemented (act 206). For example, the external system 108 may be able to authenticate the token as being one from the machine 102. An example is illustrated above showing how this might be performed.

The method 200 further includes authenticating the token or key to a particular role of the component within the machine (act 208). For example, the external system 108 may authenticate the token or key as one for a particular engine role in an airplane. Examples of how this might be accomplished are described above.

The method 200 further includes, based, on both authenticating the token or key to the machine and authenticating the token or key to the particular role of the component within the machine, authorizing the function by verifying the machine and the role, but not the specific component for the role (act 210). Thus, a component is authorized because of the role it fills in a particular machine, not because of the component itself. Note that in embodiments described herein, there may be a reference to an iteration of a component. However, this is not specific to the component, but rather is further descriptive of the role itself. For example, the iteration may define the $6^{th}$ time this role has been filled by a different component, or the $6^{th}$ time components for this role have been changed, or the $6^{th}$ time a role key has been changed for whatever reason. However, other embodiments may use component specific information when deriving role keys.

As illustrated above, the acts of method 200 may be performed by an external authority such as the external system 108 or some other system. However, in some embodiments, the acts may be performed by a component within the machine. For example, the machine 102 may have a trusted component that allows the method acts to be performed within the machine 102 itself.

The method 200 may be practiced where the token or key is derived from a machine token or key (such as the existence key 114). In some embodiment, the token or key is a token and that is signed by a machine key.

The method 200 may further include maintaining of blacklist of tokens or keys that are not authorized to be used in the context of any roles in the machine. For example, the external system 108 includes a blacklist 122 that may include a list of tokens or keys that are not authorized.

Figure 3:
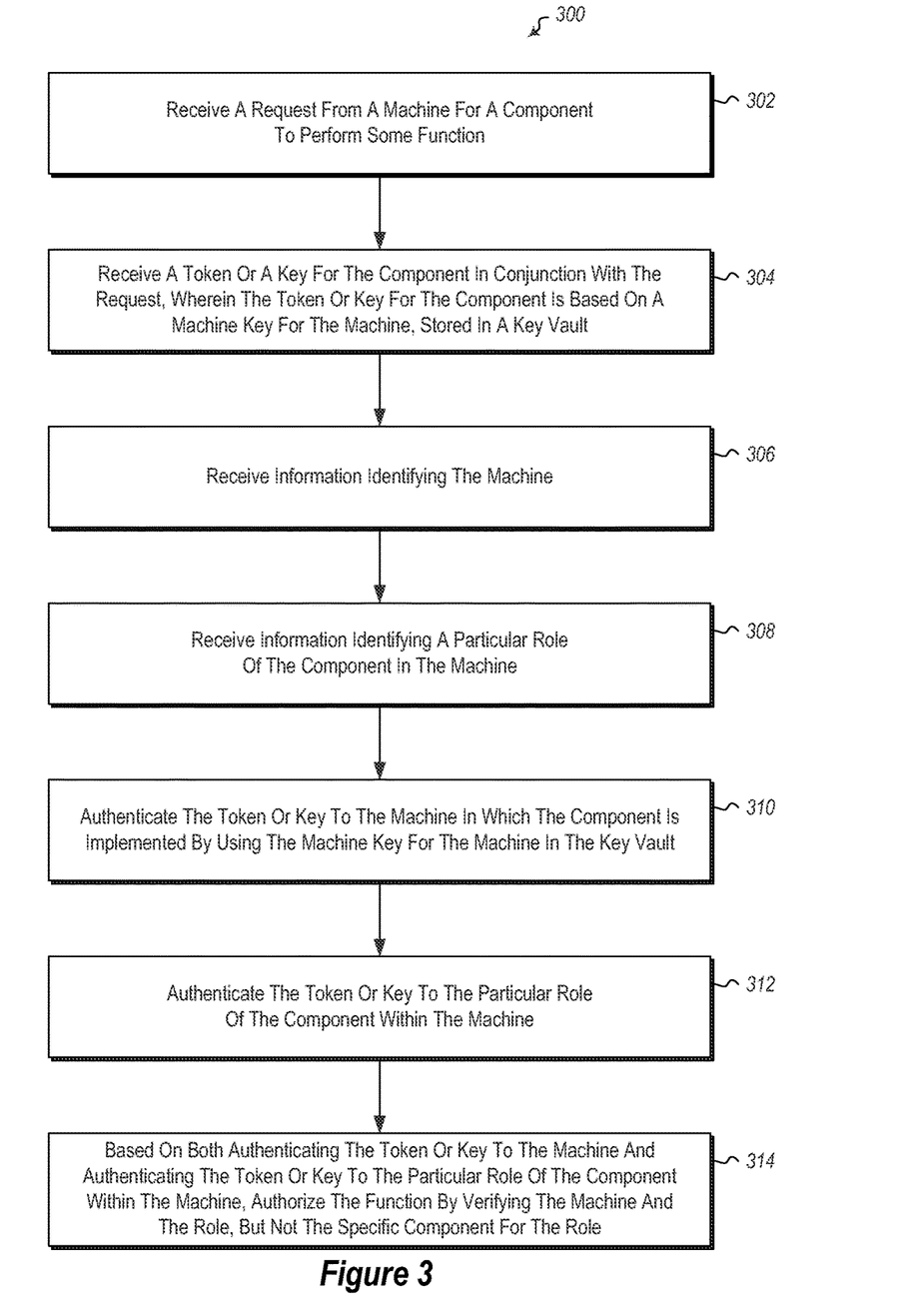
FIG. 3 illustrates another method of verifying a component in a machine.

Referring now to FIG. 3, a method 300 is illustrated. The method 300 includes receiving a request from a machine for a component to perform some function (act 302). Various examples of this are illustrated above in conjunction with other embodiments herein.

The method 300 further includes receiving a token or a key for the component in conjunction with the request, wherein the token or key for the component is based on a machine key for the machine, stored in a key vault (act 304). For example, the examples above illustrate receiving a token based on a role key.

The method 300 further includes receiving information identifying the machine (act 306). In the examples above, the machine 102 is identified to the external system 108 through the message 110.

The method 300 further includes receiving information identifying a particular role of the component in the machine (act 308). In the examples above, the role (e.g. "tb") is identified to the external system 108 through the message 110.

The method 300 further includes authenticating the token or key to the machine in which the component is implemented by using the machine key for the machine in the key vault (act 310). As illustrated above, an existence key can be used to determine that the signed token is valid for a machine.

The method 300 further includes authenticating the token or key to the particular role of the component within the machine (act 312). As illustrated above, role information can be used in an authentication verification calculation.

The method 300 further includes, based on both authenticating the token or key to the machine and authenticating the token or key to the particular role of the component within the machine, authorize the function by verifying the machine and the role, but not the specific component for the role (act 314).

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A machine comprising:
a plurality of slots each configured to receive a component of a machine, each slot representing a particular role to be performed by the component for that corresponding slot;
a plurality of components each corresponding to one of the plurality of slots, and each component representing an instance of a device that fills the particular role represented by the corresponding slot at which the component is installed, and wherein each component is configured to communicate or be communicated for, on behalf of each component's corresponding slot or the machine, to an external system or set of systems; and
wherein a different derived key is used to verify communication by or for each component with the external system;
wherein irrespective of whether a component is an original component or a replacement component, each derived key for any given component is i) derived from a discriminator so as to be unique to the instance of the device of the given component that fills the particular role represented by the corresponding slot at which the given component is installed, and is ii) derived from a machine proof for the machine and information identifying the corresponding slot in which the given component is installed; and
wherein the discriminator of each derived key comprises at least one of the following:
an iteration based discriminator based on a total number of derived keys that have been generated for a given slot; and
an iteration based discriminator based on a total number of components that have installed in a given slot.

2. The machine of claim 1, wherein each derived key for a component is derived by the external system or set of systems and provided to the component or the machine without revealing the machine proof to the component or the machine.

3. A computer-implemented method of verifying a component by verifying a machine in which the component is implemented and the role of the component within the machine in order to maintain the machine's existence identity even in the face of changing components, the computer-implemented method comprising:
receiving a request from a machine for a component to perform a given function;
generating a key for the component derived from i) a discriminator so as to be unique to an instance of the component for a particular role performed by the component for the machine, and ii) a machine proof for the machine and information identifying a corresponding slot in which the component is installed at the machine, and wherein the discriminator comprises at least one of the following:
an iteration based discriminator based on a total number of derived keys that have been generated for a given slot; and
an iteration based discriminator based on a total number of components that have installed in a given slot;
receiving a key for the component in conjunction with the request;
authenticating the key to the machine at which the component is installed;
authenticating the key to the particular role of the component;
generating a token signed with key;
based on authenticating either the signed token or key to the machine and authenticating the either the token or key to the particular role of the component within the machine, verifying the machine and the particular role, but not the specific component for the role; and
based on the verification, authorizing the component to perform the given function.

4. The computer-implemented method of claim 3, wherein the computer-implemented method is performed by an external authority.

5. The computer-implemented method of claim 3, wherein the computer-implemented method is performed by a component within the machine.

6. The method of claim 3, wherein the generated key is a role key.

7. The method of claim 6, wherein the machine proof is based on machine key.

8. The method of claim 3, further comprising;
maintaining of blacklist of tokens or keys that are not authorized to be used in the context of any roles in the machine; and
determining whether either the token or key are on the blacklist prior to authentication either the token or key.

9. A system comprising:
a key vault that stores cryptographic machine keys for one or more machines;
one or more processors; and
one or more computer-readable media, wherein the one or more computer-readable media comprise computer-executable instructions that when executed by at least one of the one or more processors cause at least one of the one or more processors to perform a computer-implemented method for verifying a component by verifying the machine in which the component is implemented and the role of the component within the machine, and wherein the computer-implemented method comprises:
receiving a request from a given machine for a component to perform some function;
receiving a token or a key for the component in conjunction with the request, wherein the token or key for the component is based on the machine key stored for the given machine in the key vault;
receiving information identifying the given machine;
receiving information identifying a particular role of the component in the given machine;
authenticating the token or key to the given machine in which the component is installed by using the machine key stored for the given machine in the key vault;

authenticating the token or key to the particular role of the component within the given machine;

based on both authenticating the token or key to the given machine and authenticating the token or key to the particular role of the component within the given machine, authorizing the function by verifying the given machine and the particular role, but not the component for the particular role;

generating at a role key computation module a role key for the component installed in the given machine from the machine key stored in the key vault for the given machine; and from a role key distribution module providing the role key to one or more components of the given machine.

10. The system of claim 9, wherein the token or role key is derived from the machine key for the given machine.

11. The system of claim 9, wherein the token is signed by the machine key for the given machine.

12. The system of claim 9, wherein the token is a time based token with an expiration.

13. The system of claim 9, further comprising a blacklist of tokens or role keys that are not authorized to be used in the context of any roles in the given machine.

14. The system of claim 9, wherein the discriminator is a time based discriminator having a time based expiration.

15. The system of claim 9, wherein the discriminator is an iteration based discriminator based on a total number of role keys that have been generated for the particular role.

16. The system of claim 9, wherein the discriminator is an iteration based discriminator based on a total number of components that have been installed for the particular role at the given machine.

* * * * *